United States Patent
Galliani et al.

(10) Patent No.: US 7,003,881 B2
(45) Date of Patent: Feb. 28, 2006

(54) PROCESS FOR ASSEMBLING MOTOR VEHICLE BODIES PROVIDED WITH DOORS, A BODY ASSEMBLED BY THE PROCESS AND A DOOR FOR SUCH A BODY

(75) Inventors: Guido Galliani, Genoa (IT); Roberto Giaccone, Chiavari (IT); Carlo E. Serrati, Tribogna (IT); Alessandro Ciampolini, Turin (IT)

(73) Assignee: Lames S.p.A., Chiavari (IT)

( * ) Notice: Subject to any disclaimer, the term of this patent is extended or adjusted under 35 U.S.C. 154(b) by 0 days.

(21) Appl. No.: 10/803,995

(22) Filed: Mar. 19, 2004

(65) Prior Publication Data
US 2004/0226158 A1 Nov. 18, 2004

(30) Foreign Application Priority Data
Mar. 21, 2003 (IT) .......................... TO2003A0209

(51) Int. Cl.
*B21D 53/88* (2006.01)
*B60J 5/04* (2006.01)
*B60J 5/00* (2006.01)

(52) U.S. Cl. .................... 29/897.2; 29/458; 49/502; 296/146.11

(58) Field of Classification Search .............. 29/897.2, 29/458, 460, 464; 49/502; 296/146.11
See application file for complete search history.

(56) References Cited

U.S. PATENT DOCUMENTS

| | | | | |
|---|---|---|---|---|
| 4,845,894 A | * | 7/1989 | Herringshaw et al. | ........ 49/502 |
| 2004/0016101 A1 | * | 1/2004 | Malik et al. | .................. 29/458 |

* cited by examiner

*Primary Examiner*—Marc Jimenez
(74) *Attorney, Agent, or Firm*—Sughrue Mion, PLLC

(57) ABSTRACT

In the process, doors are used in which a framework and an outer covering panel are constituted by two separated members, provided with reciprocal fixing means arranged in positions such as not to be visible from the outside of the finished motor vehicle. The painting of a body lacking the doors and the painting of the outer covering panels is executed. The fittings are installed on the framework of each door lacking the outer covering panel. Once the fittings are installed, each door framework lacking the outer covering panel is installed in the respective opening of the body. Finally, the respective outer covering panel is applied and fixed to the framework of each installed door.

4 Claims, 6 Drawing Sheets

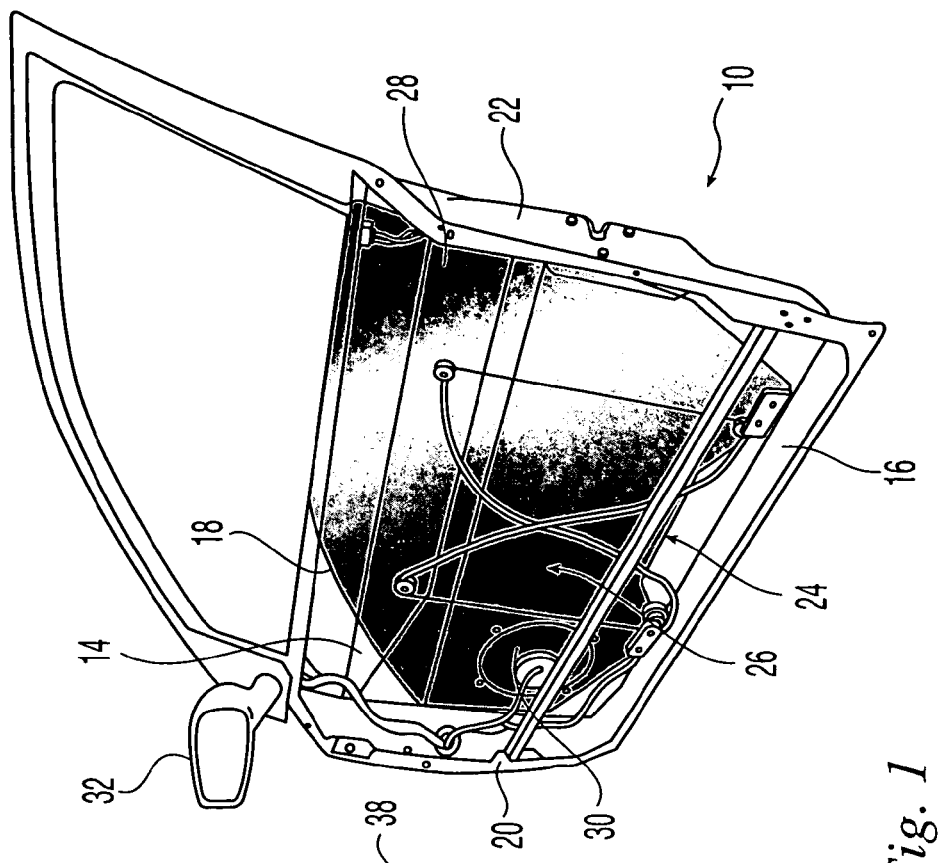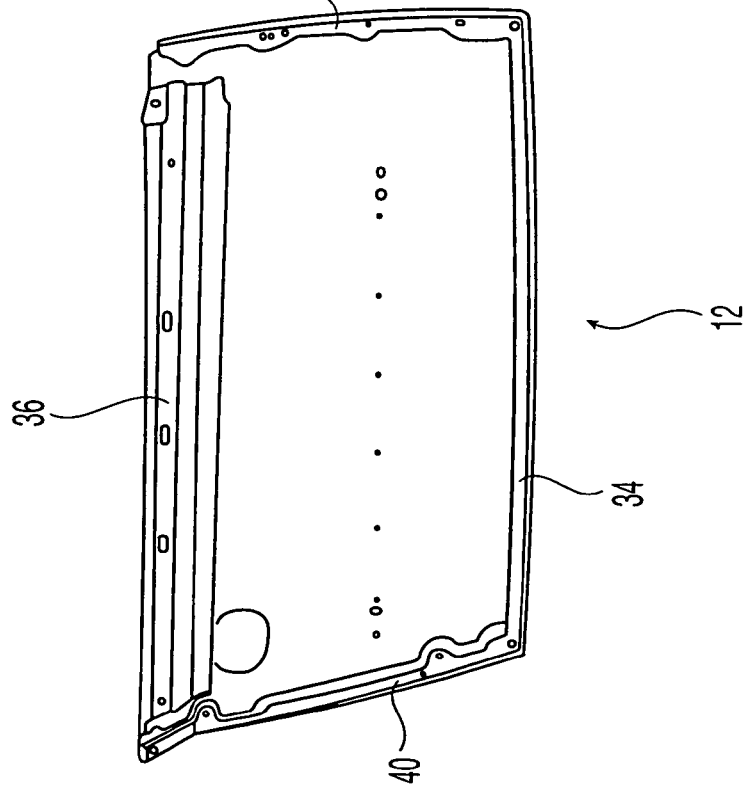
Fig. 1

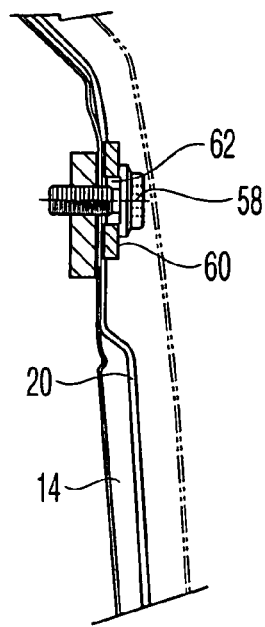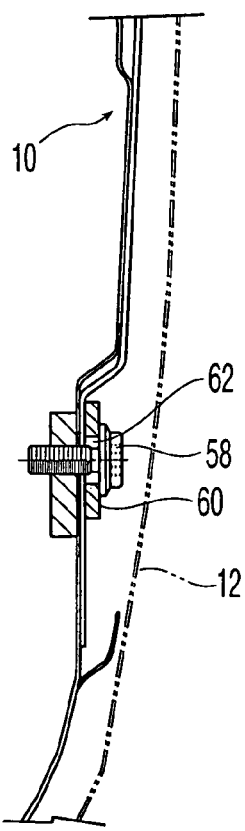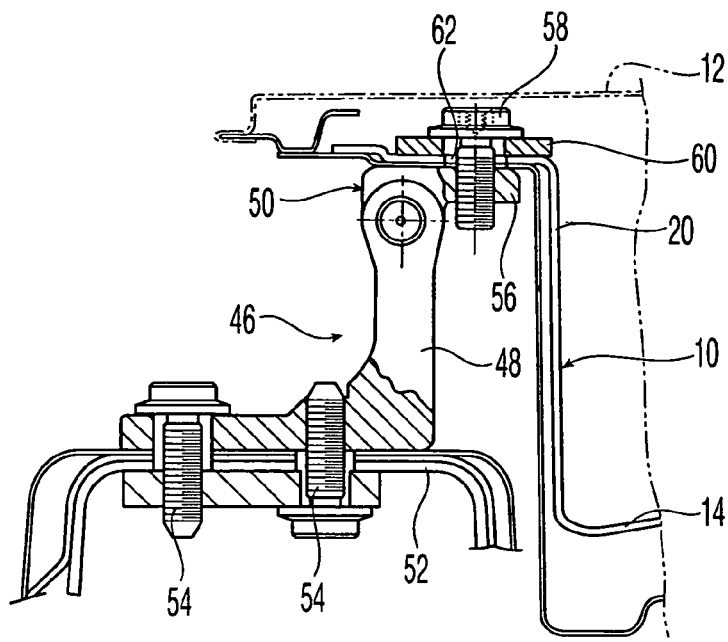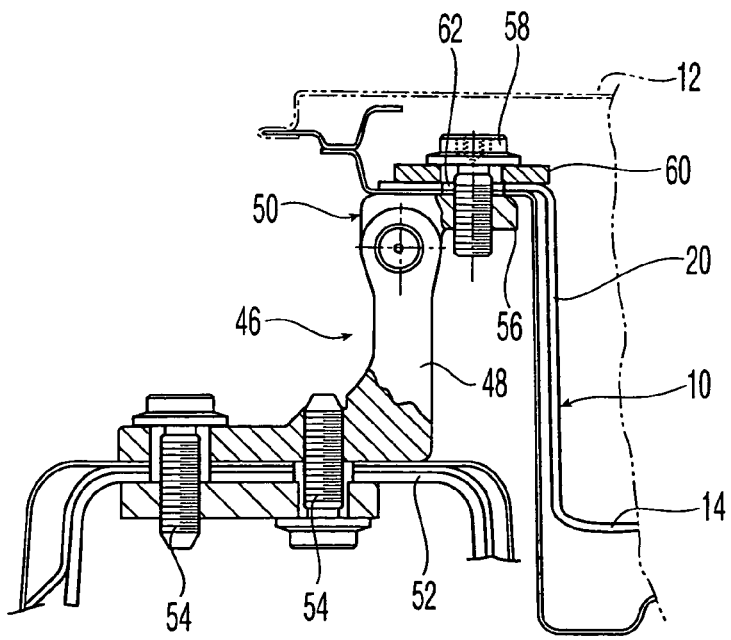
Fig. 4
Fig. 5
Fig. 6

PROCESS FOR ASSEMBLING MOTOR VEHICLE BODIES PROVIDED WITH DOORS, A BODY ASSEMBLED BY THE PROCESS AND A DOOR FOR SUCH A BODY

BACKGROUND OF THE INVENTION

The present invention relates to a process for assembling motor vehicle bodies provided with doors.

SUMMARY OF THE INVENTION

According to the commonly known prior art, the painting of the bodies is carried out with the doors, lacking their auxiliary components, already installed in the respective openings of the body and with the hinges already adjusted in order that the doors cover roughly their final positions, at least in the longitudinal direction of the vehicle.

The doors installed in this way and still not painted already comprise, in addition to the framework, an outer covering panel, called "skin" in jargon, which has been already fastened to the framework in a definitive manner by means of a seam folding and/or welding process.

The body, with the doors mounted, then passes through the whole painting process.

After painting, the painted doors are disassembled and transported to a so-called "door line", where all the components, among which the window regulators and the respective windows, the outside handles, the door locks, the possible loudspeakers, the electrical wirings and the finishing panels, are installed on them.

The assembly of the components, which are passed through openings formed in the framework, takes place from the inner side of the doors, the dimensions of these openings being as small as possible so that the door is not structurally weakened and so that the openings must be tightly closed afterwards, in order not to allow water to penetrate in the passenger compartment.

Once the assembly of all the components of the door has been completed, it is mounted again on the painted body from which it had been removed.

The whole known procedure described above is rather difficult, above all because the assembly of all the inner components of the door is performed nearly blindly and at any rate in a very much little ergonomic manner, that is not very rational.

The scope of the invention is to realize a process for assembling motor vehicle bodies, which is much more rational, and therefore more economic, of the usual known processes.

Thanks to the present invention, it is no longer necessary to paint the doors, without the outer covering panel or "skin", together with the bodies: in fact, according to the modern stylistic trends, the only portion of a door which must have the same color of the body is just the outside panel or "skin", while all the others visible portions of the door, that is the framework with the possible frame of the window, can be of another color (usually the black one).

By the process according to the invention, the doors can be prepared, that is equipped with almost all their components, from the outside, since, owing to the absence of the outer covering panel, all their inner space is easily accessible, to the advantage of the ergonomics and with possibility of automation.

This preparation of the doors can be carried out on a line fully separated from the assembly line of the vehicles, and also located in a different place.

The outer covering panels, on the other hand, may be painted together with the bodies on the same painting line, in order that they can be then applied to the doors already installed in the openings of the bodies, after having adjusted the hinges and after having completed the preparation of the door with the respective fittings, wirings and ducts.

The invention also relates to a motor vehicle body provided with doors assembled by a process, as well as a door for a motor vehicle body assembled by means of the same process.

Further characteristics and advantages of the invention will ensue from the reading of the following detailed description, which has been made with reference to the appended drawings, and is provided as a non-limitative example, and in which:

BRIEF DESCRIPTION OF THE DRAWINGS

FIG. 1 is a perspective view showing, in a separate condition, an outer covering panel of a framework of a motor vehicle door and a framework of such a door still lacking of the panel and already prepared with its fittings, FIGS. 4, 5 and 6 are enlarged partial sectional views respectively taken along lines IV—IV, V—V and VI—VI, which show the hinges of the door of FIG. 3 and the fixing and adjusting system thereof.

DETAILED DESCRIPTION OF THE INVENTION

With reference to FIG. 1, a motor vehicle door comprises a framework 10 and an outer covering panel 12, constituted by two separated elements.

Figure 8:
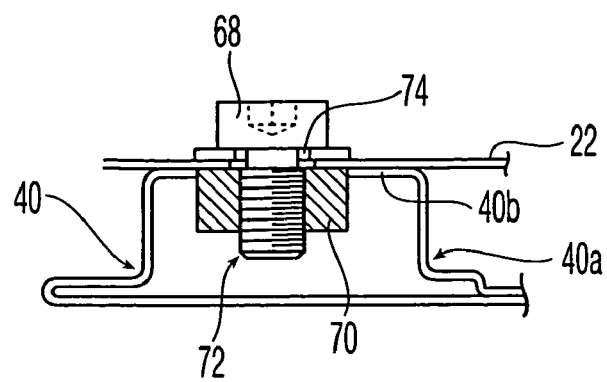
FIGS. 8, 9 and 10 are enlarged partial sectional views respectively taken along lines VIII—VIII, IX—IX and X—X of FIG. 3, which show examples of fixing means for reciprocally fixing the framework and the outer covering panel thereof.
Figure 9:
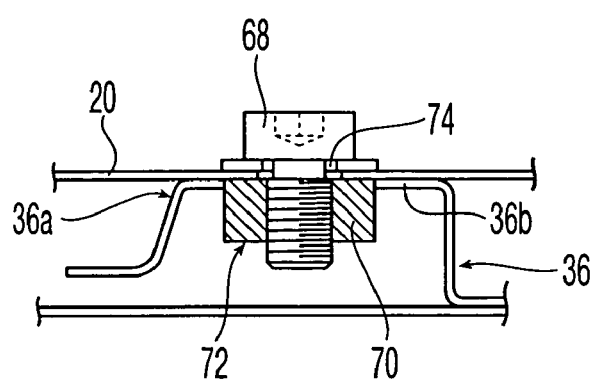
Figure 10:
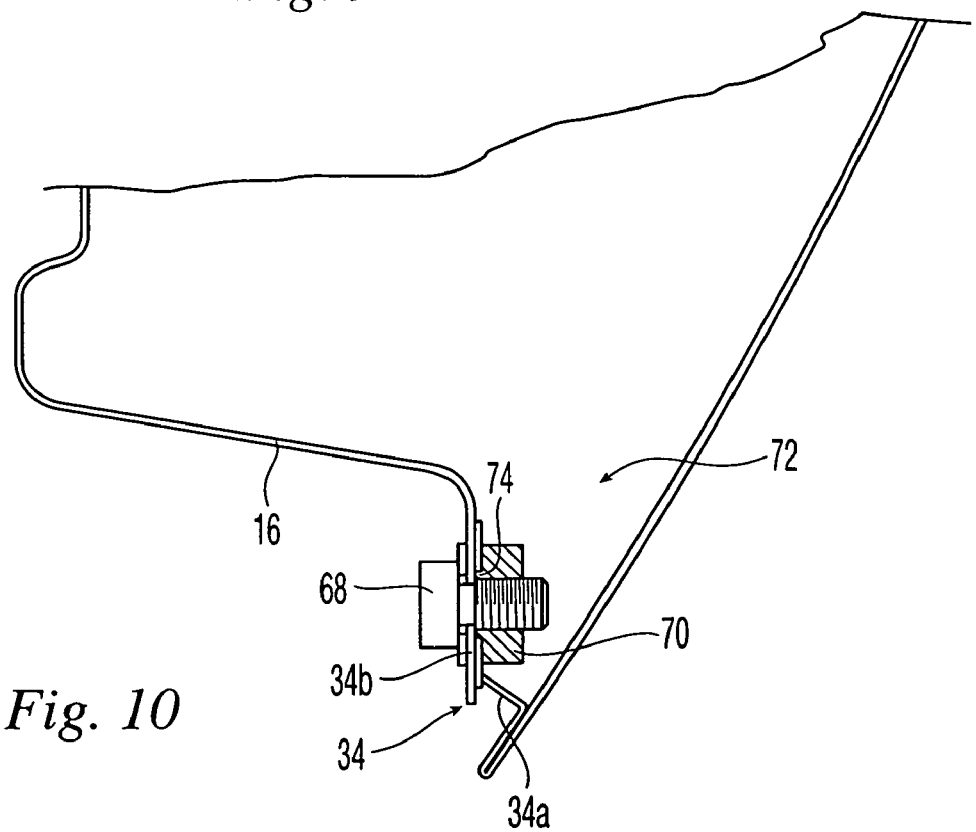

The two elements 10, 12 are provided with reciprocal fixing means, illustrated in detail in FIGS. 8, 9 and 10, which are arranged at positions such as not to be visible from the outside of the finished motor vehicle.

Figure 3:
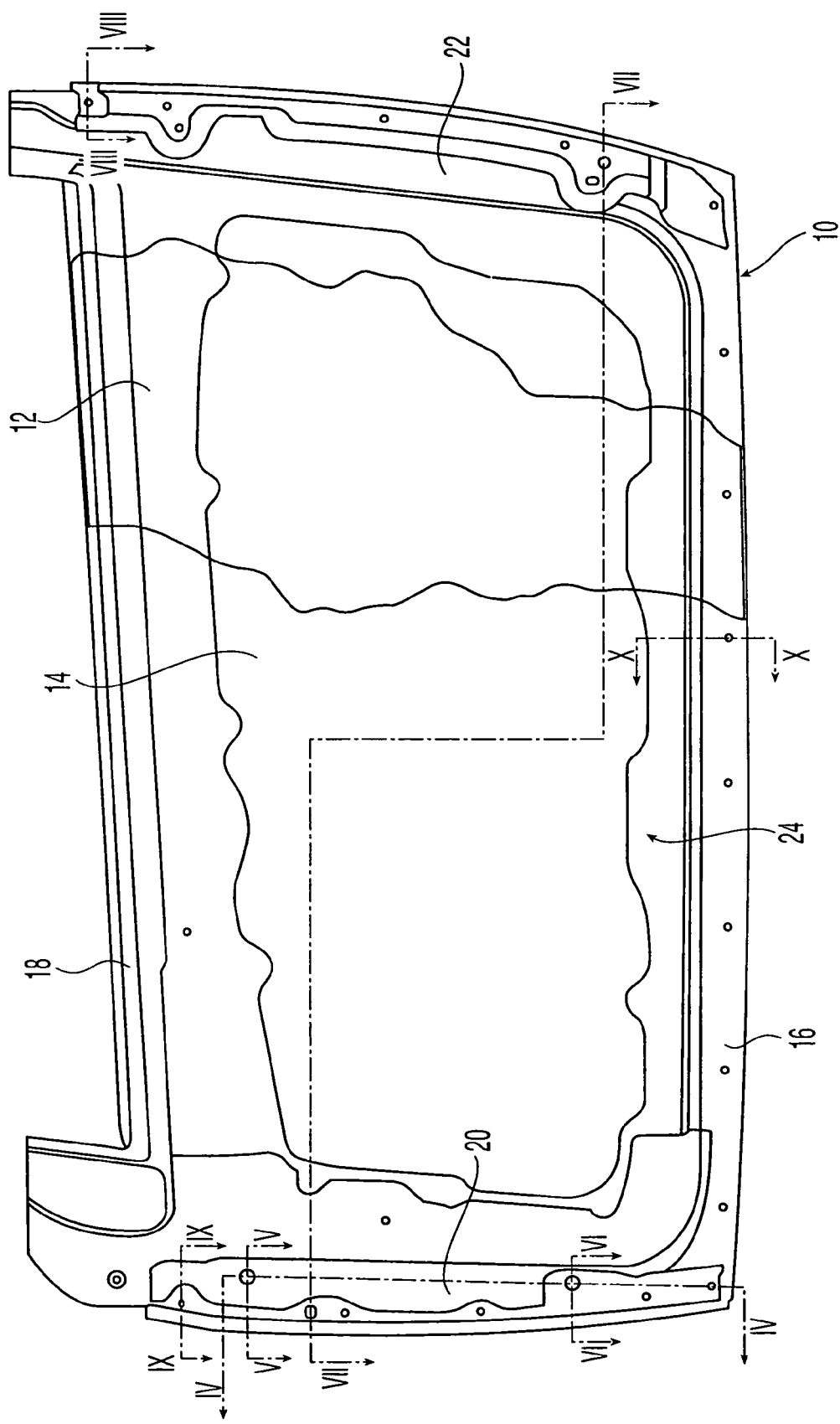
FIG. 3 is a partial elevational view of the door of FIG. 1, seen from the outer side, in which the outer covering panel already installed has been represented partially.

As also illustrated in FIG. 3, the door framework 10 is a monolithic composite sheet structure which comprises an inner ribbed wall 14, framed by two cross members, lower 16 and upper 18, and by two uprights, front 20 and rear 22.

An opening indicated 24, framed by the cross members 16, 18 and by the upright 20, 22, is completely accessible from the outside, in the absence of the panel 12.

The framework 10 is actually a motor vehicle door already painted beforehand and already prepared with the most of its fittings, such as, between the many, a window regulator mechanism 26 and the respective slidable window 28, a loudspeaker 30 and a door mirror 32, represented only in FIG. 1.

The only essential element still lacking from the framework 10 in order to constitute a finished door, is the outer covering panel 12.

Thanks to the lack of the panel 12, it has been possible to easily install the fittings in the space 24, from the outside, for example to fix to the wall 14 the window regulator mechanism 26, the window 28 and its guides, and the loudspeaker 30.

Still referring to FIG. 1, the outer covering panel 12 is a sheet panel 34 provided with lower 34, upper 36, front 38 and rear 40 edge reinforcements, located on the face of the panel 12 facing the framework 10 in the installed condition. As shown in FIGS. 8, 9 and 10, which will be described in the following, the edge reinforcements 34, 36, 38, 40, comprise, or are shaped such as, folded flaps or edge inserts defining corresponding cavities between them and the corresponding edge zone of the panel 12, for the purpose that will be clarified in the description referred to such figures.

Figure 2:
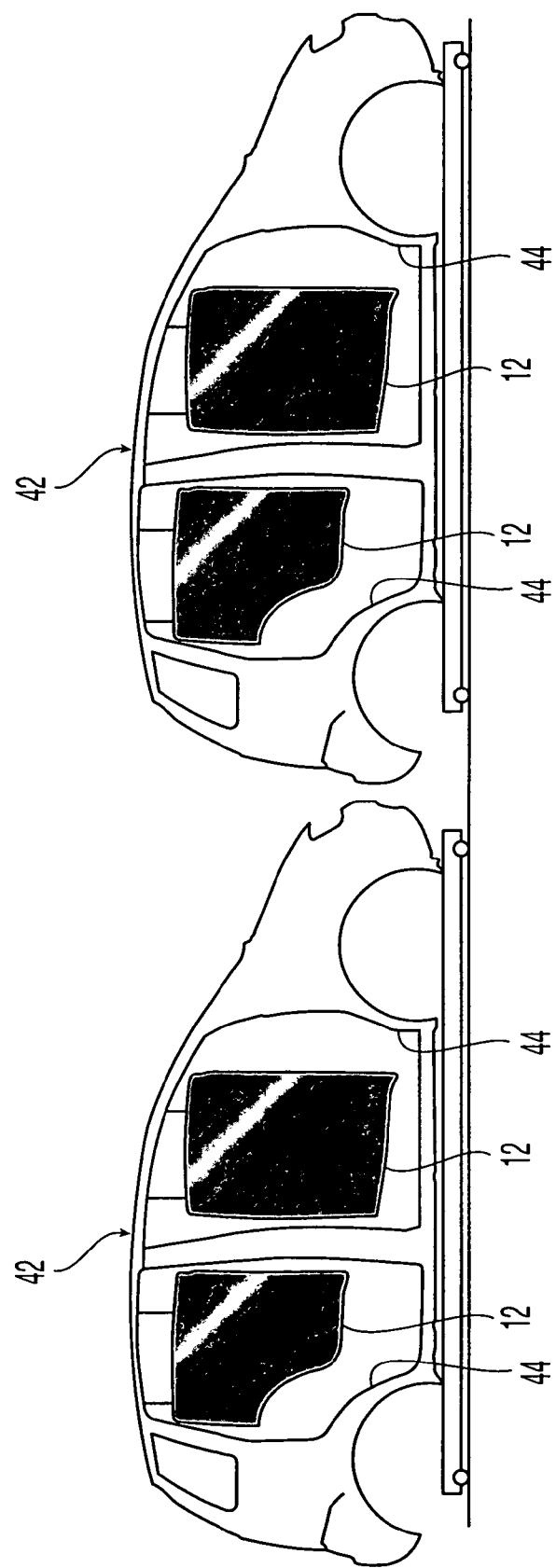
FIG. 2 is a schematic view of a painting line.

In FIG. 2 a painting line is shown, in which bodies 42 without doors are painted at the same time with the panels 12 for outer covering the frameworks 10 of FIG. 1, which are suspended in the openings 44 of the doors, for the painting.

After the bodies 42 have been painted, their preparation follows in the usual way, until the phase in which the installation of the doors can be performed, without their presence may constitute an obstacle for the operations of preparation of the inside of the vehicles.

At this point, the frameworks 10, that is the prepared doors lacking of the panels 12, are installed in the openings 44, fixing them by means of their hinges, by means of an operation of fixing and subsequent adjustment of the hinges, that will be now described with reference to FIGS. 4 to 6.

In FIGS. 4 to 6, the door framework is still indicated 10 and its inner wall is indicated 14. The outer covering panel 12 is illustrated in dashed lines in order to indicate its final position, but in a first fixing phase of the hinges it has not been still installed.

The two hinges of the door, upper (FIG. 5) and lower (FIG. 6), are both designated by 46. Their fixed portions are indicated 48, and their movable portions are indicated 50. Differently from the usual prior art, the fixed portions 48 are fixed to the respective sheet sides, indicated 52, of the respective frames of the openings 44 (FIG. 2) by means of bolts 54, without any possibility of adjustment.

Also differently from the usual prior art, the movable portions 50 are instead bolted in an adjustable manner, by means of their feet 56, to the sheet of the corresponding front upright 20 of the framework 10, by means of screws 58.

A reinforcement washer 60 is interposed between the heads of the screws 58 and the sheet of the uprights 20.

The stems of the screws 58 extend through respective holes 62 of the sheet of the uprights 20. The diameter of the holes 62 is greater than that of the stems of the screws 58, in order to allow adjustment movements, both linear and angular, of the reciprocal position of the movable portions 50 with respect to the upright 20.

As it will be understood, the arrangement of FIGS. 4 to 6 favourably allows to carry out the fixing and the adjustment of each door in its opening 44 before the respective covering panel 12 is applied, by comfortably acting on the screws 58 of each movable portion 50 from the outside of the installed door, but lacking the panel 12.

Once the door is fixed by means of the hinges 46, the connections of the doors to the body, such as the ventilation/defrosting ducts and the electrical wirings of the locks, of the window regulator motor and of the stereophonic system, are completed always working from the outside, starting from the openings 24.

Once all these operations are completed, there is nothing left to do but apply the respective painted panel 12 to each door framework 10.

As it will be clarified from the reading of the description referred to FIGS. 8, 9 and 10, preferably screws engageable with respective nuts are used, in order to fix the outer covering panel 12 to the framework 10, starting from the framework 10, through corresponding aligned holes formed in the edge reinforcements 34, 36, 38, 40 (FIG. 1) of the panel.

Preferably, in order to ensure the alignment of the aforesaid holes for the passage of the screws when the covering panel 12 is applied to the framework, door frameworks 10 and covering panels 12 provided with reciprocal positioning formations are used.

Figure 7:
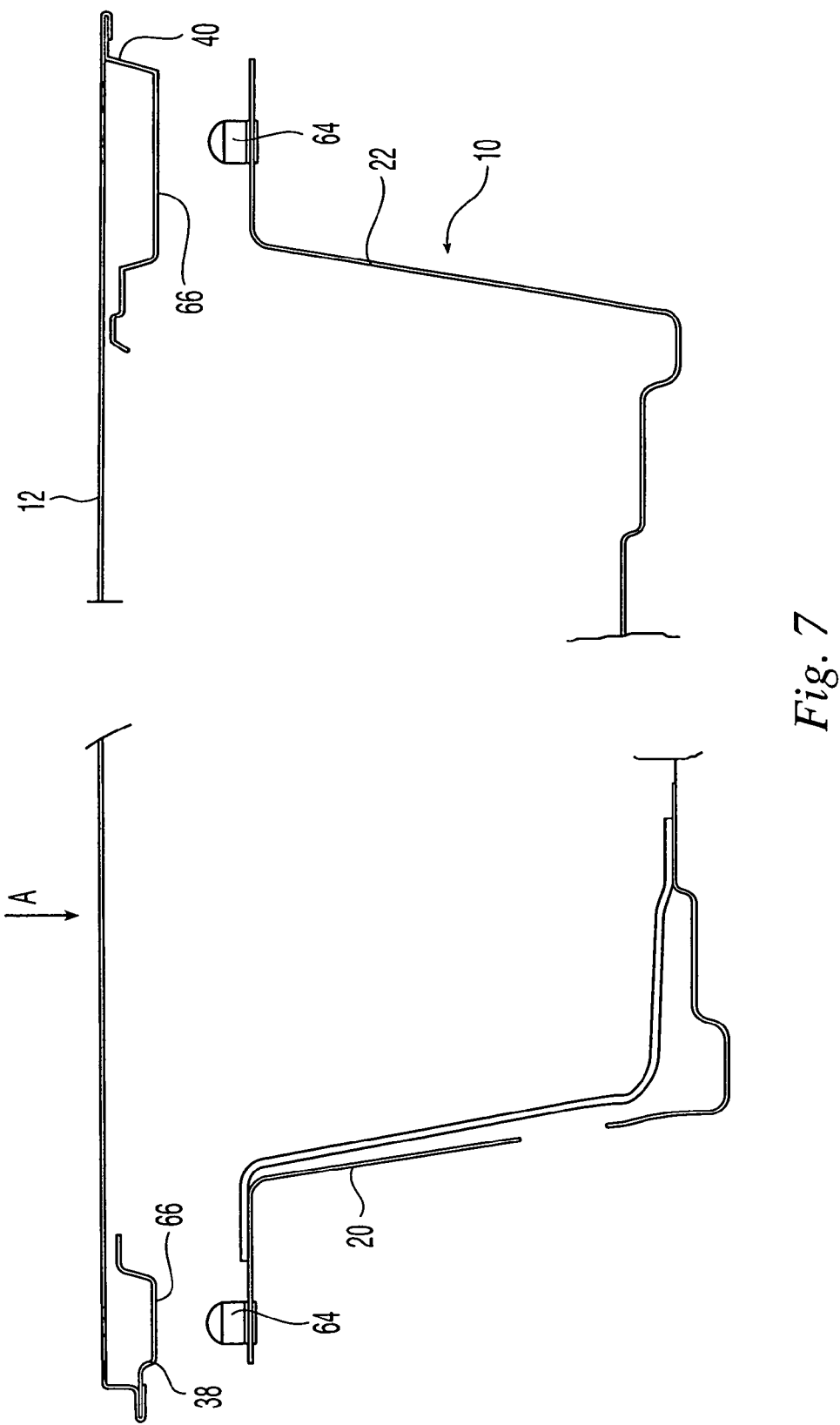
FIG. 7 is an enlarged partial sectional view taken along line VII—VII of FIG. 3, which shows a situation in which the outer covering panel is about to be applied on the door framework.

According to a preferred embodiment illustrated in FIG. 7, the reciprocal positioning formations are constituted on one side by pins 64 having a rounded head and, on the other side, by openings 66 in which the pins 64 can be inserted.

A preferred realization is represented in FIG. 7, in which two pins 64 are riveted, respectively, to the sheets of the upper portion of the front upright 20 and to the lower portion of the rear upright 22. Other pins 64, not represented, are riveted, respectively, to the sheets of the lower portion of the front upright 20 and to the upper portion of the rear upright 22.

The corresponding openings 66 have been formed in the sheet of the respective side reinforcements or inserts 38, 40 of the panel 12 before the painting thereof. For each reinforcement 38, 40, one of the openings 66 can be a circular hole and the other one can be a slot, in order to compensate possible positioning inaccuracies of the pins 64 and/or the openings 66.

In order to fasten temporarily the panel 12 to the framework 10 in a substantially precise position, it is enough to push it, by hand or by a mechanical hand, towards the framework 10, according to the arrow A of FIG. 7, by inserting to the bottom the pins 64 into the openings 66.

When the panel 12 has been so positioned, it is possible to proceed to finally fix it to the framework 10, by preferably using screws which can be screwed from the inside of framework 10 of the door, and nuts fastened to the panel 12 within the interspace formed on the inside of edge reinforcements 34, 36, 38, 40 thereof.

Reference will be made now to FIGS. 8, 9 and 10, which only constitute examples and in which the aforesaid screws are indicated 68, the corresponding nuts are indicated 70 and the aforesaid interspaces are indicated 72; the stems of the screws 68 extend through pairs of holes, jointly designated by 74, which are formed on one side in the uprights 20, 22 and in the lower cross member 16 of the framework 10 and, on the other side, in the edge reinforcements 34, 36, 38, 40.

The holes 74 of each pair are aligned by virtue of the positioning obtained by means of the pins 64 of FIG. 7.

The nuts 70, which are positioned on the inside of the interspaces 72, have been fastened, before the painting of the panel 12, by means of welding or in another way to corresponding walls of the edge reinforcements 34, 36, 38, 40, in alignment with their holes 74 for the passage of the screw stems 68.

In FIG. 8, the rear edge reinforcement 40 of the panel 12 comprises a folded flap 40a obtained following to the bending and shaping of the sheet before the painting, and which has a front wall 40b applied against the rear upright 22 of the framework 10 and to which the nut 70 is fastened within the interspace 72.

In FIG. 9, the upper edge reinforcement 36 of the panel 12, consisting of a member welded to the sheet of the panel before the painting, comprises a folded flap in the shape of an end shaped flap 36a having a front wall 36b applied against the front upright 20 of the framework 10 and to which the nut 70 is fastened within the interspace 72.

In FIG. 10, the lower edge reinforcement 34 of the panel 12 comprises a folded flap 34a obtained following to the folding and shaping of the sheet before the painting, and having a front wall 34b applied against the lower cross member 16 of the framework 10 and to which the nut 70 is fastened within the interspace 72.

Configurations for fixing the panel 12 to the framework 10, analogous to those illustrated in FIGS. 8, 9, 10, are spread in more locations of the uprights 20, 22 and of the lower cross member 16 of the framework 10, as well as in more corresponding locations of the edge reinforcements 34, 38 and 40.

Once the panel 12 has been positioned against the framework 10 in order to finally fix it, it is enough to screw tight the screws 68 into their nuts 70, from the inner face of the framework. This operation can be carried out one screw at a time with a simple screwer, or acting on all the screws at the same time with a multiple screwer.

In FIGS. 8, 9 and 10 have been illustrated examples of the preferred solution in which the reciprocal fixing means are located in positions such as not to be visible from the outside of the ended motor vehicle. Nevertheless, in the case in which the use of other fixing means should be forced by particular requirements, which are not located at the edge zones of the panel 12 and which may be visible on its outside face, it will be always possible to arrange them at suitable zones where they can be masked by any kind of method, such as the application of labels, rubber garnishes and similar.

Fixing means constituted by screws 68 and nuts 70 have been described as an example, but such fixing means could also consist of rivets which could be applied from the inner side of the framework 10.

What is claimed is:

1. A process for assembling motor vehicle bodies, comprising a painting step of a body, in which the body is provided with doors constituted by a load bearing framework and by an outer covering panel, and in which each door is provided with respective fittings and is connected to a side of the respective opening of the body by means of adjustable hinges, a fixed portion of which is bolted to the body and a movable portion of which is bolted to the framework, wherein:

doors are used in which the framework and the outer covering panel are constituted by two separated members, which are provided with reciprocal fixing means arranged in positions such as not to be visible from the outside of the finished motor vehicle;

the painting of the body lacking the doors and the painting of the outer covering panels is executed;

the fittings are installed on the framework of each door lacking the outer covering panel;

once the fittings are installed, each door framework lacking the outer covering panel is installed in the respective opening; and the respective outer covering panel is applied and fixed to the framework of each installed door, wherein hinges are used fixed portions of the which are bolted to the respective sides of the respective frames of the door openings without possibility of adjustment, and the movable portions of which are bolted to the respective frameworks in an adjustable manner by means of screws which can be screwed from the inside of the framework when the respective covering panel lacks, and wherein the adjustment of the hinges of each door is carried out by means of the aforesaid bolting screws of each moveable portion, before the application of the respective covering panel.

2. A process according to claim 1, wherein outer covering panels are used having edge folded flaps or inserts defining the front wall arranged on the face of the panel facing the framework in the installed condition and defining an interspace between it and the corresponding edge zone of the panel, and wherein at least in part fixing means comprising a nut are used, which nut has been fastened to said front wall before painting the covering panel and which is located on the inside of the interspace, and a screw engageable with the nut, from the framework, through corresponding aligned holes formed in the framework and in the front wall.

3. A process according to claim 2, wherein door frameworks and covering panels are used, which are provided with reciprocal positioning formations constituted on one side by pins and on the other side by openings in which the pins can be inserted, in order to ensure the alignment of the aforesaid holes for the passage of the screws when the outer covering panel is applied to the framework.

4. A process according to claim 3, wherein the reciprocal positioning formations are constituted by pins fixed to the frameworks and by corresponding openings formed in the folded flaps or inserts of the covering panels, before the painting thereof.

* * * * *